US011615711B2

(12) United States Patent
Ahmed et al.

(10) Patent No.: US 11,615,711 B2
(45) Date of Patent: Mar. 28, 2023

(54) PRECISION LOCALIZATION AND GEOFENCING GOVERNANCE SYSTEM AND METHOD FOR LIGHT ELECTRIC VEHICLES

(71) Applicants: Asif Ahmed, Maineville, OH (US); Timothy Everett, Niwot, CO (US)

(72) Inventors: Asif Ahmed, Maineville, OH (US); Timothy Everett, Niwot, CO (US)

(73) Assignee: Drover, Inc., Big Sky, MT (US)

( * ) Notice: Subject to any disclaimer, the term of this patent is extended or adjusted under 35 U.S.C. 154(b) by 0 days.

(21) Appl. No.: 16/862,008

(22) Filed: Apr. 29, 2020

(65) Prior Publication Data
US 2020/0372790 A1 Nov. 26, 2020

Related U.S. Application Data

(60) Provisional application No. 62/839,903, filed on Apr. 29, 2019.

(51) Int. Cl.
*G08G 1/00* (2006.01)
*G08G 1/01* (2006.01)
(Continued)

(52) U.S. Cl.
CPC ........... *G08G 1/207* (2013.01); *G01B 11/303* (2013.01); *G01B 17/08* (2013.01); *G01C 21/28* (2013.01); *G01C 21/3492* (2013.01); *G05D 1/0223* (2013.01); *G06F 18/253* (2023.01); *G06V 20/56* (2022.01); *G06V 20/588* (2022.01); *G08G 1/0112* (2013.01); *G05D 2201/0213* (2013.01)

(58) Field of Classification Search
CPC .. G08G 1/0112; G06V 10/462; G06V 20/588; G01B 11/303; G01B 17/08; G01C 21/28; G01C 21/3492; G05D 1/0223; G05D 2201/0213; G06K 9/629
See application file for complete search history.

(56) References Cited

U.S. PATENT DOCUMENTS

| 2010/0098290 A1* | 4/2010 | Zhang | G08G 1/165 701/41 |
| 2011/0098922 A1* | 4/2011 | Ibrahim | B60W 50/10 701/532 |

(Continued)

*Primary Examiner* — Rami Khatib
*Assistant Examiner* — Shahira Baajour
(74) *Attorney, Agent, or Firm* — Taft Stettinius & Hollister LLP; Anthony P. Filomena, II

(57) ABSTRACT

A location and governance system and method for light electric vehicles that includes on-board sensors and receivers for providing readings used to compute absolute and relative vehicle position information, and combining the absolute and relative position information to compute a determined vehicle position, and a current surface type being traveled on by the vehicle. Governance commands for the vehicle can be generated based on the current surface type. Positioning system receivers, inertial measuring units, cameras and other sensor can be used. Vibration analysis, image processing, transition detection and other methods can be used to determine vehicle position and surface type, and spatial databases and other resources can be used. Determining a current surface type the vehicle is travelling on can include determining whether the vehicle is traveling on a sidewalk.

11 Claims, 2 Drawing Sheets

(51) Int. Cl.
*G05D 1/02* (2020.01)
*G01B 17/08* (2006.01)
*G01B 11/30* (2006.01)
*G01C 21/28* (2006.01)
*G01C 21/34* (2006.01)
*G06V 20/56* (2022.01)
*G06F 18/25* (2023.01)

(56) References Cited

U.S. PATENT DOCUMENTS

2014/0307922 A1* 10/2014 Kim .................. G06V 40/20
  382/104
2017/0349148 A1* 12/2017 Bojanowski .......... B60S 1/0866

* cited by examiner

PRECISION LOCALIZATION AND GEOFENCING GOVERNANCE SYSTEM AND METHOD FOR LIGHT ELECTRIC VEHICLES

CROSS-REFERENCE TO RELATED APPLICATIONS

This application claims priority to U.S. Provisional Patent Application Ser. No. 62/839,903, filed Apr. 29, 2019 entitled "PRECISION LOCALIZATION AND GEOFENCING GOVERNANCE SYSTEM AND METHOD FOR LIGHT ELECTRIC VEHICLES", the disclosure of which is expressly incorporated herein by reference.

FIELD OF THE DISCLOSURE

The present disclosure relates to location tracking systems, and in particular to location tracking and geofencing systems for micromobility vehicles.

BACKGROUND AND SUMMARY

The explosive growth of the micromobility industry has led to thousands of micromobility vehicles, such as electric scooters and bicycles, filling the sidewalks of major cities across the world. In order to protect riders and pedestrians, as well as to empower cities and municipalities to govern and regulate these vehicles it would be desirable to have a vehicle tracking device that can do one or more of accurately track the location of a micromobility vehicle, tell whether the micromobility vehicle is on a sidewalk or not, and activate governance actions based on the location of the micromobility vehicle.

A precision localization and geofencing governance system and method for micromobility vehicles can use sensors, receivers and processors, on-vehicle and remote, for precision location-tracking, geofencing, and sidewalk detection of the vehicle. Micromobility vehicles, include light electric vehicles such as electric scooters, bicycles, skateboards, robotics, delivery vehicles, etc. Precision location tracking may be performed by fusing sensor data from various sources. Sensor data can include absolute position information, relative position information, image-based information, for example from a camera, and/or additional sensor data from accelerometers, gyroscopes, barometric pressure sensors, etc. The system can be used in many applications where accurate location and/or sidewalk recognition is desired.

A location and governance system for a light electric vehicle can include an on-board positioning system receiver configured to receive GNSS or other positioning system position signals; and other on-board sensors configured to provide sensor readings associated with the vehicle. The system can compute absolute position information for the vehicle based on the position signals, compute relative position information for the vehicle based on the other sensor readings, and combine the absolute and relative position information to compute a determined vehicle position and a confidence estimate for the determined vehicle position. The system can also determine a surface type currently being traveled on by the vehicle based on the determined vehicle position. The other on-board sensors can include an inertial measurement unit (IMU) configured to provide IMU readings to determine inertial movement measurements for the vehicle, a velocity sensor configured to provide velocity readings for the vehicle, a camera configured to provide visual information that can be used to determine relative movement of the vehicle, environmental sensors configured to provide environmental readings to determine changes in elevation of the vehicle, as well as other sensors. The system can also include a governance module configured to generate a governance command for the vehicle based on the surface currently being traveled on by the vehicle.

A location and governance method for a light electric vehicle can include receiving positioning system position signals for the vehicle; computing an absolute position for the vehicle based on the GNSS position signals; receiving sensor readings associated with the vehicle from other sensors on-board the vehicle; computing a relative position for the vehicle based on the sensor readings associated with the vehicle; computing a determined vehicle position using the absolute position and the relative position computed for the vehicle; and determining a current surface currently being traveled on by the vehicle based on the determined vehicle position. The method can also include generating a governance command for the vehicle based on the current surface currently being traveled on by the vehicle. Determining a current surface currently being traveled on by the vehicle can include determining whether or not the vehicle is traveling on a sidewalk. Computing a relative position for the vehicle can include using inertial measurement unit readings, velocity readings and visual information to compute the relative position for the vehicle. The method can also include determining one or more most-likely locations for the vehicle based on the computed absolute and relative vehicle positions, and determining a location surface type for each of the most-likely locations for the vehicle using a spatial database that includes a various locations in the local area, and a surface type for each individual location. The method can also include determining one or more most-likely surface types where the vehicle is located based on vibration features and image preprocessor surface types determined from sensor readings associated with the vehicle. The method can also include detecting surface transitions between surface types and determining a current transition surface type based on sensor readings associated with the vehicle. The method can also include inferring an image classifier surface type based on visual information associated with the vehicle.

Additional features and capabilities are also described in the detailed description that follows and the figures.

BRIEF DESCRIPTION OF THE DRAWINGS

The disclosure will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Micromobility vehicles, such as electric scooters and bicycles, are becoming more common in more places throughout the world. In order to protect riders and pedestrians, as well as to empower municipalities to govern and regulate these vehicles, a vehicle tracking system is needed that can accurately track the vehicle. Embodiments of the system can also determine whether or not the vehicle is on a sidewalk, and activate governance actions, for example speed regulation, based on the location of the micromobility vehicle.

Figure 1:
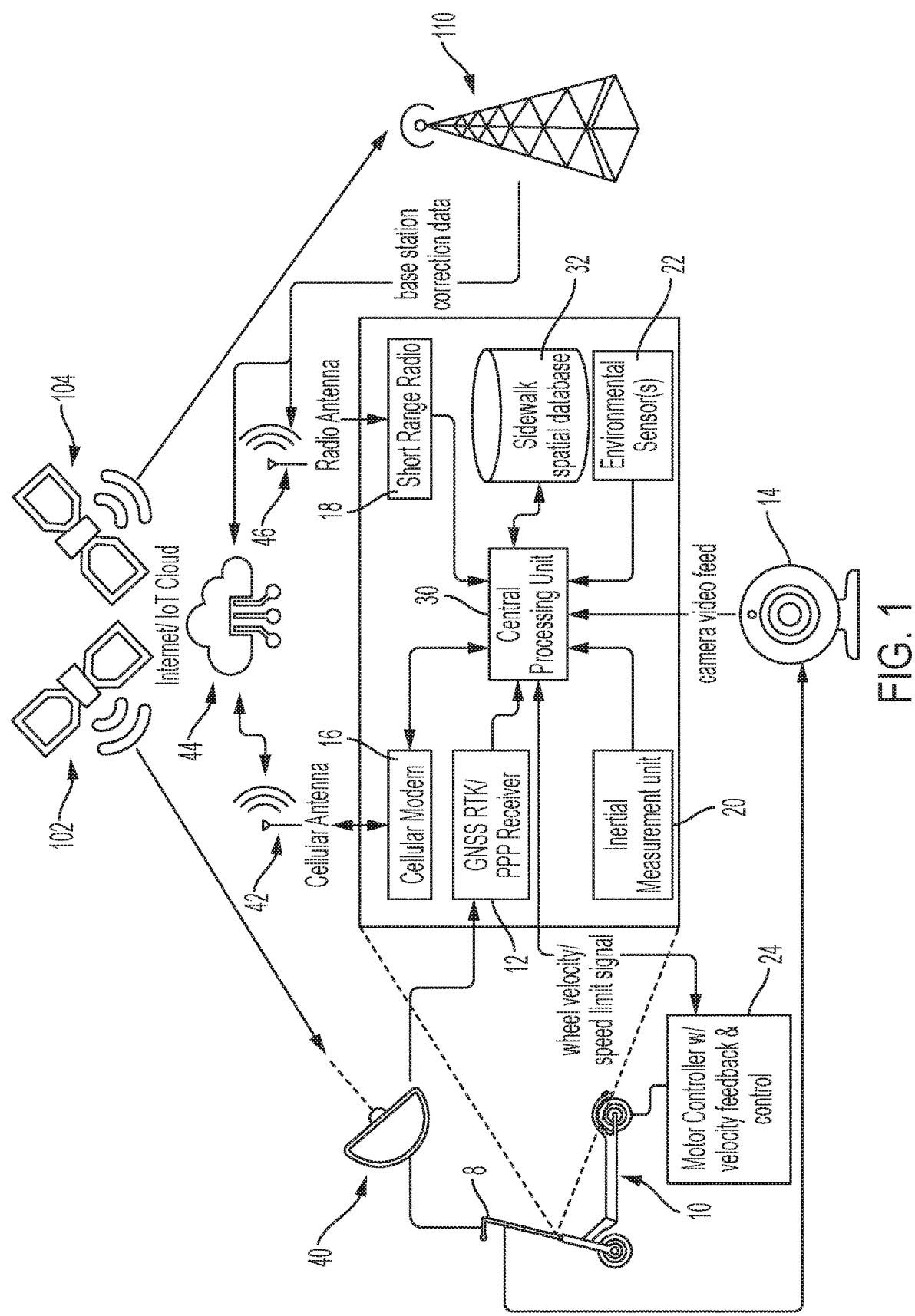
FIG. 1 illustrates an overview of an exemplary localization and geofencing governance system for a micromobility vehicle and it's environment.

A precision localization and geofencing governance system and method for micromobility vehicles can use sensors, receivers and processors that are either coupled to the vehicle or located remotely. FIG. 1 illustrates an overview of an exemplary localization and geofencing governance system for an exemplary micromobility vehicle, and an exemplary environment for its operation. Precision location tracking may be performed by fusing sensor data from various sources. Sensor data can include absolute position information, relative position information, ground/pavement texture information, pavement transition information, etc.

FIG. 1 illustrates an exemplary micromobility vehicle 10 that includes a Global Navigation Satellite System (GNSS) receiver 12, a camera 14, a cellular modem 16, a short range radio 18, an inertial measurement unit (IMU) 20, environmental sensors 22, a processor 30 and a spatial database 32. A GNSS antenna 40 can receive signals from GNSS satellites 102, 104; and provide outputs based on these signals to the GNSS receiver 12. Other positioning systems, if available, can be used to provide the position signals to be used for determining absolute vehicle position. In this disclosure the GNSS is used as an exemplary positioning system. A cellular antenna 42 can receive wireless signals from the Internet 44 or other networks, and provide outputs based on these signals to the cellular modem 16. A radio antenna 46 can receive radio signals from a GNSS base station 110 or other sources, and provide outputs based on these signals to the short range radio 18. A processing unit 30 can process inputs from these various receivers and sensors as described below.

The GNSS receiver 12 can provide absolute position information. The GNSS receiver 12 can be a Real-Time-Kinematic (RTK) GNSS (single, dual or triple band) receiver, or a Precise-Point Positioning (PPP) GNSS (single, dual or triple band) receiver, or other GNSS receiver and can include a GNSS antenna 40 to receive signals from GNSS satellites 102, 104. The GNSS receiver 12 may require an external source of GNSS correction information in order to compute an accurate position solution. The GNSS correction information may be obtained from a GNSS base station 110. In the case of RTK GNSS receivers, GNSS correction data may be provided by a local standalone GNSS base station 110, or by utilizing a network of GNSS base stations, typically referred to as CORS/VRS infrastructure, which exists in many regions to support surveying and agricultural applications. In the case of PPP GNSS receivers, GNSS correction data may be provided by a global GNSS correction data source, such as Sapcorda.

The GNSS receiver 12 operates best when it has a clear view of the sky in order to track multiple GNSS satellites 102, 104 and compute a position solution. In non-urban outdoor environments, a clear view of the sky is typical, and in these environments RTK or PPP-based GNSS receivers may be sufficient to track the location of the vehicle 10 with a precision of less than or equal to 10 cm. However, in urban environments such as cities, tall buildings, tunnels, and other structures may significantly occlude the view of the sky available to the GNSS receiver 12. Furthermore, parasitic RF phenomena such as multipath interference may occur, further degrading the performance. In such cases, few GNSS satellites 102, 104 may be visible to the GNSS receiver 12, and the provided position solution may be inaccurate and/or intermittent.

The GNSS receiver 12 can provide confidence information about the computed absolute position of the vehicle 10, providing information about how accurate the current position solution is likely to be. In order to assist in mitigating the multipath interference and limited sky view in urban/occluded environments, a tightly-coupled fusion algorithm may be used. The tightly-coupled GNSS fusion algorithm may utilize additional relative position information, described below, to help constrain the noisy GNSS data in the near-term timeframe. For example, in an occluded sky view and/or multipath environments, the position solution from the GNSS receiver 12 alone may contain excessive noise, and therefore outlier points. Position constraints derived from readings of the additional sensors on the vehicle 10 can be used to improve the integer ambiguity resolution step performed in differential GNSS position solutions by adjusting the residuals of each potential integer set with the additional position constraints before resolving the ambiguities. While a tightly-coupled GNSS solution may improve the position solution by rejecting noise, due to the potential for occluded sky views, especially in urban environments, in order to provide robust location tracking across multiple environments, additional sources of information may be required.

Relative position information may be obtained by fusing together information from multiple sensors on the vehicle 10 to track relative vehicle movements, for example using dead reckoning. Inertial sensors, such as accelerometers, gyroscopes or combinations thereof in the IMU 20 can provide readings that can be integrated over time to provide inertial movement measurements. Environmental sensors 22, such as barometric pressure, temperature, and humidity sensors, can provide readings that can be used to detect changes in elevation. The motor controller 24 can include a velocity sensor to provide vehicle wheel velocity from a hardware or software rotary encoder, such as a magnetic quadrature encoder or a motor controller with a velocity observer, which may track the vehicle's wheel movement, which is assumed to be moving against the ground surface. The camera 14 can provide visual movement information which may provide relative movement/posture information by analyzing frame-to-frame feature movements. Image-based information can be used for image classification, visual odometry, optical flow, and texture analysis.

The heading and velocity of the vehicle 10 can be estimated from the disparate, and sometimes redundant, information from the various available sensor readings by fusing the absolute and relative position data into a coherent position calculation using an extended Kalman filter (EKF). The extended Kalman filter can combine the best features of each information source to provide a robust position calculation for the vehicle 10, even in cases where one or more of the sensors contain noisy or inaccurate data (for example, an urban canyon environment resulting in poor absolute information from GNSS data, or a high vibration environment which adds significant noise to the IMU data, or a blocked camera sensor making visual odometry or optical flow unreliable).

Each sensor type used in this data fusion scheme may provide complementary value. Readings from the IMU 20 provide information about relative changes in heading and distance, which generally has a high responsiveness and accuracy in the short-term, but has a tendency to drift (accumulate error) in the long term. Wheel velocity readings from the motor controller 24 provides information about relative changes in distance, which generally has good accuracy in the long-term, but may be unreliable in the short-term due to inaccuracies in wheel circumference, or due to wheel slippage. Visual odometry and/or optical flow information captured by analyzing the frame-to-frame movement of images from the camera 14 may provide accurate relative heading and distance information in the long-term, but due to a low frame-rate and image noise, may not be able to detect abrupt movements, and therefore may suffer from a low-resolution in the short-term. By feeding all of these sensor inputs into the Extended Kalman Filter designed to utilize the complementary properties of these data, a robust, responsive, and accurate relative position may be tracked. Combining this fused relative position information with the absolute position solution using an additional extended Kalman filter yields a position solution that has far greater accuracy, refresh rate, and immunity to urban canyons/occluded sky views than any of the disparate sensor information alone can provide.

Ground/pavement texture information may be obtained from a combination of visual texture classification and texture vibration analysis. Visual texture classification may be performed by taking images of the pavement using the camera 14. The images from the camera 14 can be fed directly into a machine learning algorithm, or texture features can be calculated first using texture descriptor methods such as the Haralick technique, and then the resulting features fed into a machine learning algorithm. These images may be fed into a feature-extraction machine learning algorithm which has been previously trained on a multitude of road and sidewalk texture features. This texture classification algorithm can compute whether the captured texture image features likely represent a road pavement surface texture (vehicle is on a road) or a sidewalk pavement surface texture (vehicle is on a sidewalk), along with a confidence indicator of how probable the result is to being correct. Texture vibration analysis may be performed by analyzing accelerometer data from the IMU 20, which can sense vibration. The vibration data may be processed using a fast-Fourier transform (FFT) method, which extracts resonant frequency information about the vibration induced by the pavement surface texture that the vehicle is currently moving on, and compensates for the varying resonances caused by fluctuating vehicle velocities. The resultant FFT feature information may be fed into the machine learning algorithm, in conjunction with visual texture feature information, to further increase the accuracy and confidence in the visual texture classification result.

Pavement transitions (i.e. vehicle transitioning from a road surface to a sidewalk surface, or vice-versa) may be detected by analyzing height change information from the IMU 20 and/or the environmental sensors 22 (i.e. barometric pressure sensor), and repeating patterns in the vision-based texture classifier (described above). Height change information from the IMU 20 may be determined by continuously monitoring the Z-axis accelerometer from the IMU 20, which measures relative movement in the up-down (gravitational) direction. Height change information from the environmental sensors 22 may be determined by taking period readings from the barometric pressure sensor and compensating for temperature and humidity. The resultant sensor values can be strongly correlated with elevation. Since most urban road/sidewalk transitions include a surface level change (i.e. sidewalk is typically slightly elevated from road surface), the z-axis accelerometer of the IMU 20 and the environmental sensors 22 can typically sense the abrupt upward/downward movement during these transitions. In addition, the IMU 20 can detect a change in inclination as the vehicle passes through the transition (vehicle pitches upward as it enters upward ramp from road to sidewalk, vehicle pitches downward as it enters downward ramp from sidewalk to road). Repeating patterns in the vision-based texture classifier may be obtained by analyzing a histogram of the visual texture classifier data. Multiple repeating peaks in this data can be strongly correlated with repeating expansion joints typically designed into urban sidewalks. The sudden presence or absence of these repeating histogram peaks may be used as an additional source of pavement transition information. The resulting output from the pavement transition detection may include status about whether an abrupt elevation change just occurred, as well as a confidence score representing how probable the event is to have occurred.

The spatial database 32 can include data for city roads, sidewalks, bike lanes, and other transit infrastructure that can be used by the system to aid in sidewalk detection, and may also be used to correlate detected pavement transition events with the absolute location of the event. The spatial database 32 may be in any spatial data format, for example ESRI shapefile format, KML format, PostGIS database, Spatialite database, or others. The spatial database 32 may contain boundary definitions of sidewalks, vehicle parking zones, roads, bike lanes, and other known landmark-based feature data. The boundary data may be indexed using a spatial indexing method, such as P-tree, for rapid lookup, retrieval, and calculations of the data. The spatial database 32 may also contain machine learning feature data about each polygon definition, for use in pavement texture classification (described above) and/or final behavioral or governance change events in the vehicle, such as parking rules and speed limits. The machine learning feature set for each polygon can evolve over time based on feeding back data from the vehicles 10 into the polygon/feature database.

Figure 2:
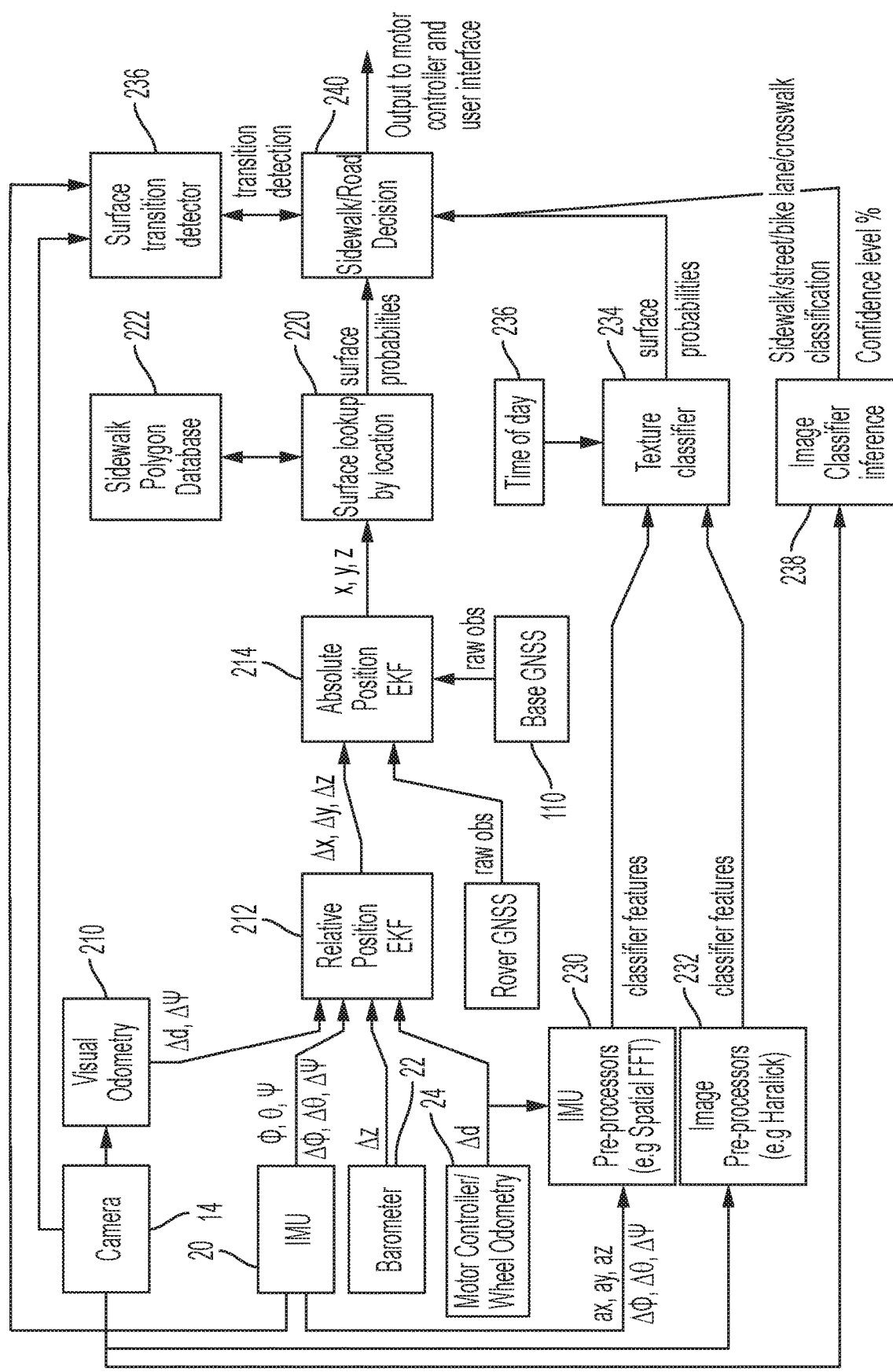
FIG. 2 illustrates a flow diagram of a control process of an exemplary localization and geofencing governance system for a micromobility vehicle.

FIG. 2 illustrates a flow diagram of a control process 200 of an exemplary localization and geofencing governance system used to derive a high confidence estimate of absolute position of a micromobility vehicle 10 from a fusion of sensor readings. The inertial measurement unit (IMU) 20 can measure acceleration, angular velocity and magnetic field in three axes and output these measurements along with an estimate of heading derived from internal fusion of the raw measurements. The camera 14, which can face forward and downward on the vehicle 10, can output a stream of images in digital format. The motor controller 24 can output a count of wheel rotations. The environmental sensors 22, which can include a barometer, can measure relative atmospheric pressure that can be used to estimate relative differences in vehicle altitude. The calculations may take place locally using a processing unit 30 on the vehicle 10 to allow real-time responsiveness, reduce dependence on cellular/radio connectivity, and improve the robustness of the solution.

The output of the camera 14 can be fed into a visual odometry processing module 210 which uses differences between adjacent images to estimate relative changes in vehicle position and heading.

The outputs of the IMU 20, the motor controller 24, the environmental sensors 22 and the visual odometry module 210, along with confidence estimates of each measurement, can be fed into a relative position extended Kalman filter (EKF) 212 which can fuse the multiple inputs into an optimal estimate of relative position and heading. The relative position EKF 212 outputs estimates of change in position relative to the previous sample in three axes, with confidence estimates of each position estimate.

The outputs of the relative position EKF 212 can be fed to an absolute position EKF 214. The absolute position EKF 214 can also receive raw observation and navigation streams from GNSS receivers, including the GNSS receiver 12 mounted on the vehicle 10, and/or a base GNSS receiver configured to receive GNSS signals from a GNSS base station 110 located in a fixed and precisely known location. The base GNSS receiver of the vehicle 10 can be the short-range radio 18, the wireless cellular receiver 16 or other receiver configured to receive GNSS data from the fixed GNSS base station 110. The absolute position EKF 214 can estimate absolute position from the GNSS inputs provided by the GNSS receivers using a real-time kinematic (RTK) differential solution technique augmented with the estimated relative position outputs of the relative position EKF 212. In an alternative implementation, the absolute position EKF 214 can estimate the absolute position first using just the inputs from the GNSS receivers and then the absolute position can be fused with the relative position measurements from the relative position EKF 212 in an additional processing step. The absolute position EKF 214 outputs estimates of latitude, longitude, and height, along with confidence estimates of each.

The outputs of the absolute position EKF 214 can be fed to a surface lookup module 220. The surface lookup module 220 can also connected to a sidewalk polygon database 222 which contains a list of polygons describing the absolute location of all sidewalks in the local area as well as surface types for each sidewalk polygon and adjacent street. The sidewalk polygon database 222 can be part of the spatial database 32. The surface lookup module 220 searches the polygon database 222 using the absolute location estimates to determine if that location is inside any sidewalk polygon. Based on this information, along with confidence estimates of the absolute position and distance from the polygon boundary, the surface lookup module 220 estimates probabilities that the vehicle 10 is on a sidewalk or a road. The surface lookup module 220 passes the probabilities that the vehicle 10 is on a sidewalk or a road, along with surface types, to a sidewalk/road decision module 240.

Acceleration measurements and relative heading estimates from the IMU 20, along with relative distance measurements from the motor controller 24 can be fed to an IMU preprocessor module 230. The IMU preprocessor module 230 uses various techniques (e.g. spatial FFT) to extract vibration features from the raw data that have been determined to be useful for distinguishing different surfaces (for example asphalt, concrete, etc.). Images from the camera 14 can be fed to an image preprocessor module 232 that uses various image processing techniques (e.g. Haralick) to extract visual features from the raw images that have also been determined to be useful for distinguishing different surfaces. The vibration features from the IMU preprocessor module 230 and the visual features from the image preprocessor module 232 can be combined into a single feature set which can then be fed to a texture classifier module 234. Other inputs such as time of day 236 or vehicle velocity from the motor controller 24, that have been found to be useful for texture classification can also be added to the feature set used by the texture classifier module 234. The texture classifier module 234 can be trained using standard machine learning techniques to distinguish between multiple surfaces including asphalt, concrete, and brick using the classifier set as input. The texture classifier module 234 outputs a set of probabilities for each surface type to the sidewalk/road decision module 240.

Relative heading estimates from the IMU 20, relative height estimates from the environmental sensors 22, and images from the camera 14 can be fed into a surface transition detector 236. The surface transition detector 236 can use machine learning algorithms or other techniques to detect transitions from sidewalk to road or road to sidewalk based on visual, orientation, and height cues from the input data. Additional information from the sidewalk/road decision module 240 can also be fed into the surface transition detector 236 to improve its detection capabilities. Based on these inputs, the surface transition detector module 236 outputs a probability that the vehicle 10 has just transitioned from one surface to another to the sidewalk/road decision module 240.

Images and image information from the camera 14 can be fed to an image classifier inference module 238. The image classifier inference module 238 can perform image classification using neural-network-based image classifier algorithms, known in the art as deep-learning, or RNN/CNN (recursive neural network/convolutional neural network) algorithms. These algorithms use a previously-trained model based on annotated training images to infer what is being seen by the camera's current view, for example sidewalk, road, bike lane, crosswalk or other surface. The image classifier inference module 238 can output a classification of the surface being traveled upon by the vehicle 10 with a confidence level, or probabilities for various surface types that the vehicle 10 is currently traveling on that surface type. The outputs of the image classifier inference module 238 can be fed to the sidewalk/road decision module 240.

Sidewalk detection may be performed by utilizing a combination of location (position), image classification inference, texture analysis, and transition event cadence-based information. The sidewalk/road decision module 240 receives the probability estimates that the vehicle 10 is on a sidewalk or a road, and the surface types output by the surface lookup module 220; and the set of probabilities for each surface type output by the texture classifier module 234; and the probability that the vehicle 10 has just transitioned from one surface to another output by the surface transition detector module 236. The sidewalk/road decision module 240 combines these inputs to determine an estimate of whether the vehicle is currently on a road or sidewalk and outputs this information, along with a confidence level. The outputs from the sidewalk/road decision module 240 can be sent to the motor controller 24, a governance module, or to another system or module that can generate and send governance commands based on the outputs from the sidewalk/road decision module 240. The governance commands can be commands to control the vehicle 10, for example, to enforce a speed limit or other restriction on the vehicle 10 based on the outputs of the sidewalk/road decision module 240.

The absolute position of the vehicle 10 can be determined using a combination of absolute and relative position information (described above). Dead reckoning may be determined by a combination of visual odometry, optical flow, IMU 20, and wheel velocity, and this information may be fused using an Extended Kalman filter (described above). The IMU 20 and camera 14 may be mounted on the handlebar stem 8 of the vehicle 10 such that the sensors 14, 20 rotate with the vehicle's handlebars 8, providing future state heading information about the vehicle 10. The location estimate may include both position and confidence (accuracy) information.

The likelihood that the vehicle 10 is currently on a sidewalk, as well as a probability of which particular sidewalk/polygon the vehicle may be located on may be determined by finding all surface polygons from the spatial database 32 within a radius of the current estimated location of the vehicle 10. The dimension of this radius may be determined based on the confidence information from the previously estimated position solution (i.e. higher-confidence position solutions will result in a smaller radius, and conversely, lower-confidence position solutions will result in a larger radius). Each sidewalk polygon in this radius may be assigned a probability score based on a combination of proximity to the estimated location of the vehicle 10, position variance, and historical texture/feature classification information. These probability scores may be convolved with the current output from the ground/pavement texture classifier 234 to find the polygon with maximum likelihood. If the polygon with highest likelihood is a known sidewalk polygon, the system may assert that the vehicle 10 is currently on a sidewalk, and the estimated position solution of the vehicle 10 may be augmented towards the center of the polygon's defined location.

Pavement transition events sensed by the surface transition detector 236 may be used to increase or decrease confidence in the current estimate of surface texture by correlating transition events with changes in the detected pavement texture. For example, if a road to sidewalk (upward) transition is detected with high probability, the likelihood of nearby sidewalk polygons can be increased and road polygons decreased. Conversely, if a sidewalk to road (downward) transition is detected, likelihood of nearby road polygons can be increased and sidewalk polygons decreased.

Once a final position solution for the vehicle 10 has been computed, and a highest-likelihood polygon has been determined, the system may signal a behavioral or governance change to the vehicle 10 in order to enforce rules applied to the vehicle. For example, if the vehicle 10 is determined to be on a sidewalk, and the sidewalk polygon record from the spatial database 32 contains a speed limit rule that is lower than the current speed of the vehicle 10, then the system can generate a command to govern speed to the defined speed limit in the sidewalk polygon record. Such behavior/governance rules may be contained within the spatial database 32, along with sidewalk polygon boundary definitions.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as described herein.

We claim:

1. A location and governance method for a light electric vehicle, the location and governance method comprising:
   receiving position signals for the vehicle from a position receiver;
   computing an absolute position for the vehicle based on the position signals;
   receiving inertial measurement unit (IMU) readings for the vehicle from an IMU on-board the vehicle;
   receiving velocity readings for the vehicle from a velocity sensor on-board the vehicle;
   receiving visual information for the vehicle from a camera on-board the vehicle;
   computing position change values for the vehicle based on the IMU readings, the velocity readings and the visual information;
   determining one or more most-likely locations for the vehicle based on the absolute position and the position change values computed for the vehicle;
   determining a location surface texture for each of the one or more most-likely locations for the vehicle using a spatial database comprising a plurality of locations in a local area, and a surface texture for each individual location of the plurality of locations in the local area;
   determining a current surface texture of a ground surface currently being traveled on by the vehicle based on the one or more most-likely locations for the vehicle and the location surface texture for each of the one or more most-likely locations; and
   controlling a velocity of the vehicle based on the current surface texture of the ground surface currently being traveled on by the vehicle.

2. The location and governance method of claim 1, further comprising:
   generating a governance command for the vehicle based on the current surface texture of the ground surface currently being traveled on by the vehicle.

3. The location and governance method of claim 1, further comprising:
   extracting vibration features based on the IMU readings and the velocity readings;
   determining image preprocessor surface textures based on the visual information;
   determining one or more most-likely surface textures where the vehicle is located based on the vibration features and the image preprocessor surface textures; and
   wherein determining the current surface texture of the ground surface currently being traveled on by the vehicle comprises using the one or more most-likely surface textures where the vehicle is located.

4. The location and governance method of claim 1, further comprising:
   detecting surface transitions between location surfaces based on the IMU readings; and
   determining a current transition surface texture based on the detected surface transitions; and
   wherein determining the current surface texture of the ground surface currently being traveled on by the vehicle comprises using the current transition surface texture.

5. The location and governance method of claim 4, wherein detecting the surface transitions comprises detecting upward transitions and downward transitions of the vehicle; and wherein determining the current transition surface texture based on the detected surface transitions comprises determining the current transition surface texture is a sidewalk when an upward transition is detected, and determining the current transition surface texture is a road when a downward transition is detected.

6. The location and governance method of claim 1, further comprising:
inferring an image classifier surface texture based on the visual information, and
wherein determining the current surface texture of the ground surface currently being traveled on by the vehicle comprises using the image classifier surface texture.

7. The location and governance method of claim 1, further comprising:
extracting vibration features based on the IMU readings and the velocity readings;
determining image preprocessor surface textures based on the visual information;
determining one or more most-likely surface textures where the vehicle is located based on the vibration features and the image preprocessor surface textures;
detecting surface transitions between location surfaces based on the IMU readings; and
determining a current transition surface texture based on the detected surface transitions; and
inferring an image classifier surface texture based on the visual information,
wherein determining the current surface texture of the ground surface currently being traveled on by the vehicle comprises using the one or more most-likely surface textures where the vehicle is located, the current transition surface texture and the image classifier surface texture.

8. The location and governance method of claim 7, wherein:
determining the one or more most-likely locations for the vehicle based on the absolute position and the position change values, further comprises determining confidence levels for each of the one or more most-likely locations for the vehicle;
determining the one or more most-likely surface textures where the vehicle is located based on the vibration features and the image preprocessor surface textures, further comprises determining confidence levels for each of the one or more most-likely surface textures where the vehicle is located;
determining the current transition surface texture based on the detected surface transitions, further comprises determining a confidence level for the current transition surface texture;
inferring the image classifier surface texture based on the visual information, further comprises determining a confidence level for the image classifier surface texture; and
determining the current surface texture of the ground surface currently being traveled on by the vehicle comprises using the one or more most-likely locations for the vehicle, the one or more most-likely surface textures where the vehicle is located, the current transition surface texture and the image classifier surface texture and the confidence levels for each of the one or more most-likely locations for the vehicle, the one or more most-likely surface textures where the vehicle is located, the current transition surface texture, and the image classifier surface texture.

9. The location and governance method of claim 1, wherein determining the current surface texture for of the ground surface currently being traveled on by the vehicle comprises:
determining whether the vehicle is currently traveling on a sidewalk.

10. The location and governance method of claim 1, further comprising:
determining confidence levels for each of the one or more most-likely locations for the vehicle; and
wherein determining the current surface texture of the ground surface currently being traveled on by the vehicle comprises using the one or more most-likely locations for the vehicle, the location surface texture for each of the one or more most-likely locations, and the confidence levels for each of the one or more most-likely locations for the vehicle.

11. A location and governance method for a light electric vehicle, the location and governance method comprising:
receiving position signals for the vehicle;
computing an absolute position for the vehicle based on the position signals;
receiving inertial measurement unit (IMU) readings from an IMU on-board the vehicle;
receiving velocity readings from a velocity sensor on-board the vehicle;
receiving visual information from a camera on-board the vehicle;
computing position change values for the vehicle based on the IMU readings, the velocity readings and the visual;
computing a determined vehicle position using the absolute position and the short term position change values computed for the vehicle;
extracting vibration features based on the IMU readings and the velocity readings;
determining image preprocessor surface textures based on the visual information;
determining one or more most-likely surface textures where the vehicle is located based on the vibration features and the image preprocessor surface textures;
determining confidence levels for each of the one or more most-likely surface textures where the vehicle is located;
detecting surface transitions between location surfaces and determining a current transition surface texture based on the IMU readings and the visual information, determining a confidence level for the current transition surface texture;
inferring an image classifier surface texture based on the visual information,
determining a confidence level for the image classifier surface texture;
determining a current surface texture of a ground surface currently being traveled on by the vehicle based on the determined vehicle position, the one or more most-likely surface textures where the vehicle is located, the current transition surface texture and the image classifier surface texture, and the confidence levels for each of the one or more most-likely surface textures where the vehicle is located, the current transition surface texture, and the image classifier surface texture; and
controlling a velocity of the vehicle based on the current surface texture of the ground surface currently being traveled on by the vehicle.

* * * * *